United States Patent [19]
Fuller

[11] Patent Number: 5,796,986
[45] Date of Patent: Aug. 18, 1998

[54] METHOD AND APPARATUS FOR LINKING COMPUTER AIDED DESIGN DATABASES WITH NUMERICAL CONTROL MACHINE DATABASE

[75] Inventor: Mark Fuller, San Jose, Calif.

[73] Assignee: 3Com Corporation, Santa Clara, Calif.

[21] Appl. No.: 703,110

[22] Filed: Aug. 22, 1996

Related U.S. Application Data

[63] Continuation of Ser. No. 444,944, May 19, 1995, abandoned.

[51] Int. Cl.⁶ ................................................ G06F 15/46
[52] U.S. Cl. ........................ 395/500; 395/80; 395/670; 395/671; 395/680; 395/682; 364/488; 364/489; 364/468.01; 364/468.02
[58] Field of Search .............................. 364/489, 498, 364/491, 468.01, 468.02, 130, 136, 478.01; 395/80, 85, 11, 76, 77, 670, 88, 671, 680, 682; 29/703, 740, 741, 739

[56] References Cited

U.S. PATENT DOCUMENTS

| | | | |
|---|---|---|---|
| 3,653,072 | 3/1972 | Ballas et al. | 444/1 |
| 4,342,090 | 7/1982 | Caccoma et al. | 364/491 |
| 4,681,452 | 7/1987 | Watanabe | 356/375 |
| 4,720,798 | 1/1988 | Reed et al. | 364/489 |
| 4,723,221 | 2/1988 | Matsuura et al. | 364/559 |
| 4,737,845 | 4/1988 | Susuki et al. | 358/101 |
| 4,767,489 | 8/1988 | Lindner | 156/345 |
| 4,780,617 | 10/1988 | Umatate et al. | 250/548 |
| 4,922,434 | 5/1990 | Fule | 364/513 |
| 5,272,641 | 12/1993 | Ford et al. | 364/468 |
| 5,425,036 | 6/1995 | Liu et al. | 371/23 |
| 5,452,226 | 9/1995 | Hooper et al. | 364/489 |

Primary Examiner—Kevin J. Teska
Assistant Examiner—Thai Phan
Attorney, Agent, or Firm—Townsend and Townsend and Crew LLP

[57] ABSTRACT

An integrated manufacture and design system and a database translator that allows use of a subset of data directly from a CAD database to provide the necessary control data for use in a CAM assembly system. A database translator according to the present invention can examine the CAD data specifying a product, determine which of the component parts of that product are unknown to the CAM assembly system, and can insert into the CAM assembly system's database whatever new information the CAM system requires to manufacture the product. The invention may be embodied as a number of software modules on a fixed medium such as a computer readable disk or computer memory.

16 Claims, 2 Drawing Sheets

METHOD AND APPARATUS FOR LINKING COMPUTER AIDED DESIGN DATABASES WITH NUMERICAL CONTROL MACHINE DATABASE

This is a Continuation of application Ser. No. 08/444,944, filed May 19, 1995, now abandoned.

This invention pertains to the field of computer aided design (CAD) and computer aided manufacture(CAM). More particularly, this invention pertains to a system for automating data sharing among a CAD design system and a CAM assembly system.

BACKGROUND OF THE INVENTION

As the computer industry has continued to expand over the last several decades, techniques and tools for the design and assembly of electronic products made in high volume have become more automated. During the design stage of electronic products, a number of CAD tools may be used to assist in the electrical and mechanical design of the product. Once the design is complete, a number of CAM tools and robots may be employed in the manufacture of the product.

One age old problem in using CAD and CAM tools to create a finished product is that the data stored in and used by the CAD systems is not the same data that must be stored in or used by the CAM assembly systems. There is a lot of detailed data used in the CAD system that is unnecessary for the final assembly of the product and there is some data that is critical to the assembly of the product that is not used by the CAD system. Typically, prior art systems solve this problem by transferring data between the CAD systems and the manufacturing operation through hard copy with human interpretation and annotation. The CAD system produces hard copy drawings of the product to be built and then those drawings are given to the manufacturing engineers. The manufacturing engineers, looking at the CAD drawings, ignore the details that are not needed in order to build the product and add other information, obtained from component suppliers or by physically measuring the component, that is necessary for product assembly. If robots are used in the manufacturing line, the robots are generally trained or programmed by hand by a technician reading the CAD drawings. In earlier systems, the technician typically uses a small keypad to direct and store the individual actions of the robots that are necessary to assemble the product. More advanced prior art CAM systems can automatically program a robot's movements using a database containing information about the overall product design and about the size, shape, and placement of each component part of the product. Even in these systems, the data in the robot's programming database must to be entered by hand by a process engineer looking at hard copy drawings and other hard copy information from the CAD system.

One barrier to data sharing between a CAD tool and a CAM robot system is that often the CAD tool and the robot system are run on two completely different and incompatible platforms and that have different database structures. Many CAD design systems are run on UNIX-based workstations, while many robot control systems are DOS based. Therefore, there is no easy way for the databases to share data.

The process of having a human translate design data from a CAD system to a manufacturing system is slow, costly, and prone to errors. What is needed is a system that allows design CAD data to be directly and automatically used to provide the control data necessary for product assembly by CAM equipment.

SUMMARY OF THE INVENTION

The present invention is an integrated manufacturing and design system and a database translator that allows use of a subset of data directly from a CAD database to provide the necessary control data for use in a CAM assembly system. A database translator according to the present invention can examine the CAD data specifying a product, determine which of the component parts of that product are unknown to the CAM assembly system, and can insert into the database of the CAM assembly system whatever new information the CAM system requires to manufacture the product. The present invention can accomplish these tasks even where the CAD operating system is wholly different from and incompatible with the operating system used by the CAM system line. The present invention further provides a mechanism by which certain data that is not used by the CAD system, but is used by the CAM assembly system, is entered into the CAD system and stored in the CAD system database. The present invention may be employed in a wide range of CAD/CAM manufacturing systems that design and manufacture any variety of electrical or mechanical products and was developed primarily for use in a system for designing and manufacturing populated printed circuit board products such as network adaptor cards. The present invention may be embodied in a number of active software modules running on one or more-computer systems. The present invention may also be embodied as a unified software component stored on a floppy disk, an optical disk, in a computer RAM or ROM memory or by any other electronically accessible media.

DETAILED DESCRIPTION OF SPECIFIC EMBODIMENTS

Figure 1:
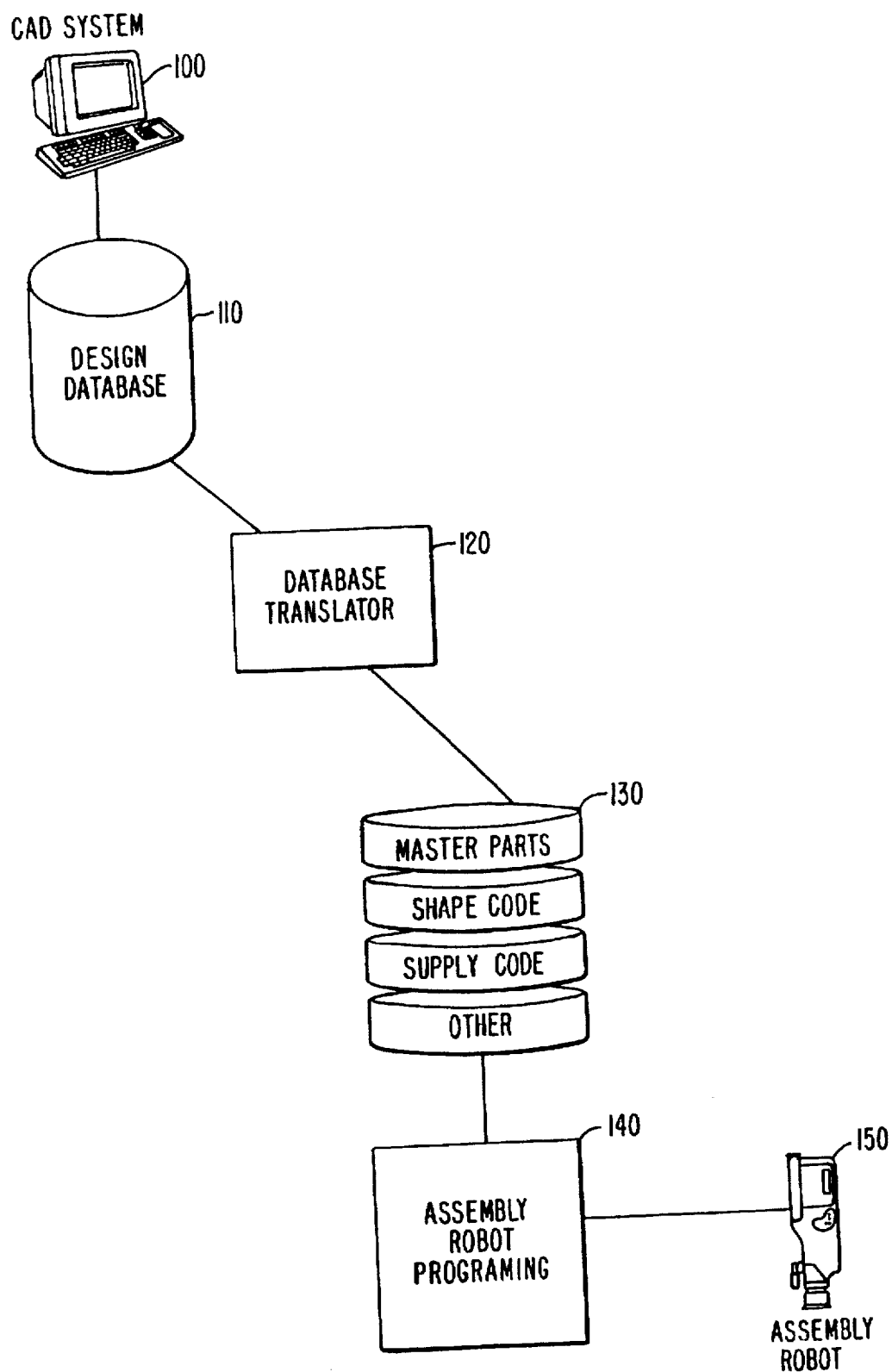
FIG. 1 is a schematic block diagram of a CAD/CAM system according to the present invention.

While the present invention may be used in any number of manufacturing environments and with any number of different CAD and automatic manufacturing tools, for the purposes of clarity and by way of example, this discussion will be directed to the design and manufacture of populated printed circuit boards (PPCBs). A PPCB consists of a generally rigid card or board with electrical conducting traces on the two surfaces of the card and embedded in layers in the card with insulating material in between. Electrical parts such as packaged integrated circuits, capacitors, resistors, and connector plugs are mounted to the card and soldered in place.

Design of the PPCB consists of choosing the electrical parts that must be included in the design and determining the electrical interconnections between them. CAD design tools are typically used to conduct circuit simulations, to determine or help determine a placement of parts on the board to allow for easiest routing of electrical signals, and to determine the shape and layer placement of the electrical traces on the PCB. One example of a CAD design system for creation of PPCB designs is the UNIX-based Visula™ CAD system (also now know as Expert from Zuken-Redac Inc.).

PPCB CAD systems typically create and use a large design database. This database will contain detailed electrical and physical information about every individual part that makes up a PPCB design. Generally, this data is separated into different data files. One file may specify the location on the board of each part, but not have any information in it about that part other than a part number (In Expert, these files are referred to as *.SMT files, where the * is replaced with a part number, i.e. 0021R01.SMT.) Other files will associate a particular part number with a number of characteristics, such as its shape code or electrical behavior. (This file is referred to as the part master file.) Where a number of different parts share a group of characteristics, those characteristics are sometimes collected together and given a code. The physical dimensions of a part are generally indicated in a part file by means of a shape code. A separate shape code file stores each shape code along with its particular physical dimensions. In this way, two identically shaped parts can share the physical dimension data by using the same shape code.

According to the invention, the CAD design database is also enabled to store information about a part that is irrelevant to the PPCB design, but is critical in the manufacture of the PPCB. One such item of information is the supply code, which specifies the type of carrier in which the part is supplied to the manufacturing equipment. As an example, many types of parts are most efficiently supplied in large reels containing hundreds of identical parts attached to a paper or plastic carrier. These reels may be fed into a automatic staple-gun-like device for very fast insertion into a board. The supply code will specify the type and size of the reel that holds a supply of the parts for the manufacturing equipment.

After the design of the PPCB is complete, the PPCB is ready to be manufactured. The first step in manufacturing is creating the PCB card, which will not be further discussed here. Once the card is created, the next step is assembling the parts onto the card. In many prior art manufacturing systems, this assembly was accomplished by hand. As described above, the most modern manufacturing operations use a number of robots in an assembly line to place parts onto the PCB card, but even these modern systems require hand entry of the data used to control the movements of the robots. According to the invention, a CAD/CAM system is enabled to transfer data from a CAD database to a database used to program the CAM robots.

A system built according to the invention is shown in FIG. 1. In this specific embodiment, CAD system 100 is a CAD system for designing PPCB's. CAD design database 110 is the database used to store all of the mechanical and electrical data needed to design a particular PPCB and is enhanced according to the invention to allow for storage of data items related solely to manufacturing, such as a part's supply code. In a particular embodiment, CAD system 100 is the UNIX-based Expert system from Zuken-Redac.

Database translator 120 is a system that reads data from database 110 and determines which of that data is needed by the robot control database 130. Translator 120 flags the data needed by database 130 and then inserts that data into the robot control database 130. In a particular embodiment, translator 120 is a PC-type computer or a workstation running appropriate software and having interface interconnections to the CAD and CAM systems. The invention may be embodied in software stored in the workstation either in a disk-type storage medium or in computer memory. Specific embodiments of translator 120 are described in more detail in FIGS. 2 and 3. Robot control database 130 is used by robot programmer 140 to determine the individual movements that robot 150 must perform in order to correctly pick up and place all of the parts that are used to make up the PPCB. Note that the format of database 130 might be very different from the format of database 110 and that the two databases might be stored in two entirely different operating system environments. It is the job of the database translator 120 to enable data transfer between the two databases. In a specific embodiment, robot programmer 140 is the Panatools™ system by Panasonic™, which runs in essentially a DOS environment. Note that while just one robot is shown in FIG. 1, a typical assembly line will contain a number of different robots, each needing to be programmed. Depending on the system, each robot may have its own robot programmer 140 that communicates with the database translator 120, or a number of robots may be programmed by a single programmer 140.

Robot database 130 in FIG. 1 is illustrated as consisting of four separate files in accordance with specific embodiments. These four files are the Master Parts file, which contains information about each part used in the PPCB design, the Shape Code file, which contains physical dimension information for each different shape used in the PPCB design, and the Supply Code file, which contains supply information for different supply code used in the PPCB design. The file designated other could be any other file needed by the robot programmer. Appendices A through D list examples of data stored in these files in specific embodiments of the invention. In the embodiment illustrated by appendices A through D, there are two supply type files. The file reel.dat holds data needed to described parts fed into a CAM robot on a reel, and the file tray.doc holds data needed to described the tray locations of parts fed into a CAM robot in a tray.

Figure 2:
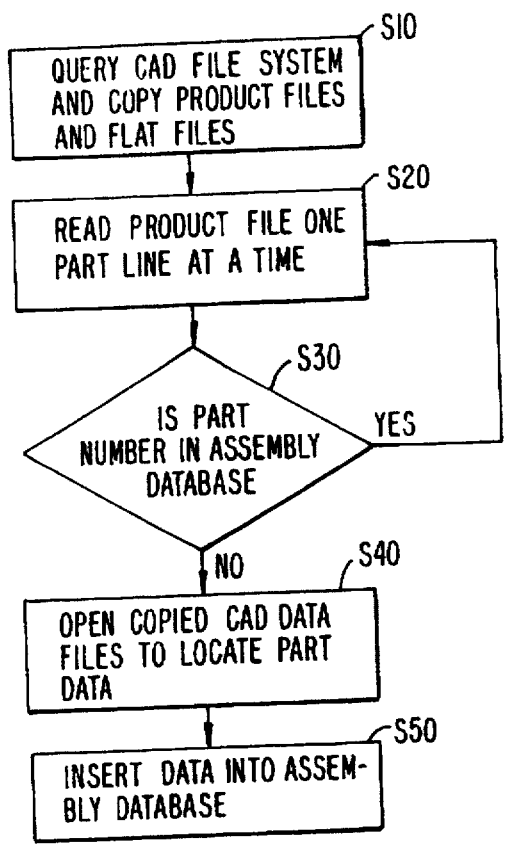
FIG. 2 is a flow chart of the operation of a database translator according to the present invention.

FIG. 2 is a flowchart of the steps taken by translator 120 to translate from the CAD database 110 to the robot database 140. Translator 120 first reads from the CAD file system the PPCB or product file that specifies the parts used in the PPCB and reads all necessary part data (Step S10). Translator 120 next reads one line at a time from the product file to locate part number data in that line (Step S20). Translator 120 next queries robot database 130 to determine whether that part number is already present therein (Step S30). If the part number is already present in robot database 130, the translator loops back and reads the next line from the product file (Step S20). If the part number is not already present in robot database 130, the translator opens the CAD data files it copied in Step S10 and locates the data for that particular part (Step S40). Once the data is located for that part, the translator opens the robot database and inserts the part data into the robot database (Step S50). In a specific embodiment, robot database 130 contains four separate database files. In this case, the query step performed in S30 is performed separately in each of the four files, and only those files that do not contain entries needed for the PPCB design are updated; for example if a particular part number is not known to database 130, but is shape code and supply code is known, then only the part number data file is updated with the new data.

In a particular embodiment, robot database 130 is a DOS-based Panatools™ database that is designed in such a way that it is difficult to modify or update the database using external software tools. Translator 120 in this embodiment uses a commercially available tool, named Codebase™, to assist it in inserting data into the Panatools™ database.

In a specific embodiment, the functions of translator 120 are implemented in part by a software system. Appendix E is a program source code listing written in C++ that implements some of the functions of translator 120.

Figure 3:
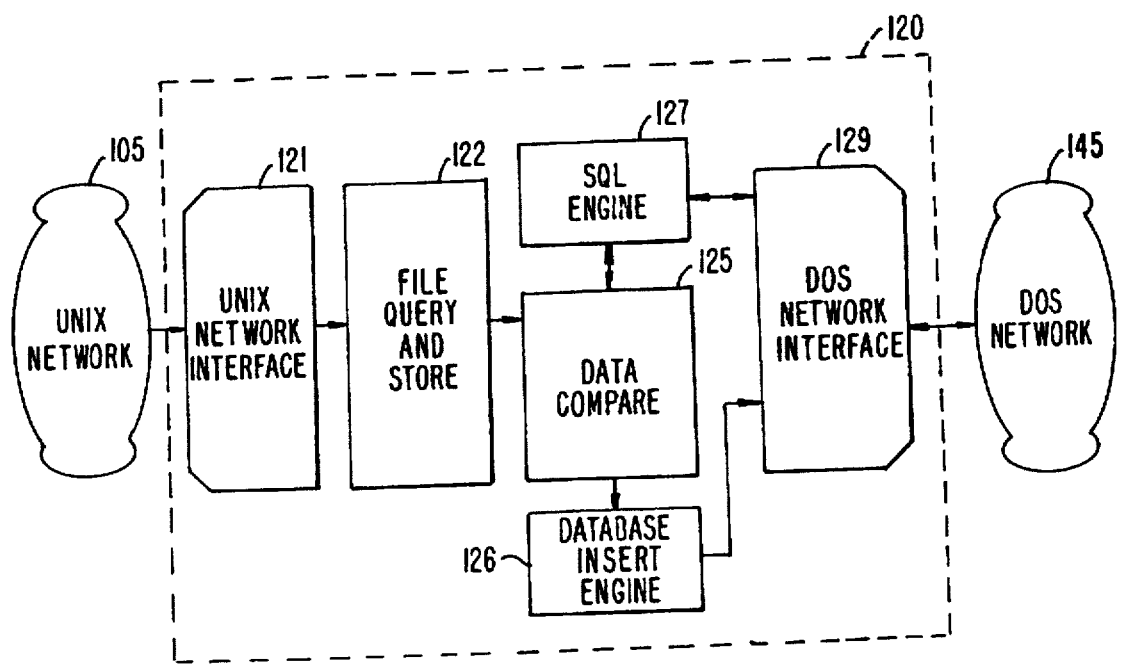
FIG. 3 is a schematic block diagram of a database translator according to the present invention.

FIG. 3 is a schematic block diagram showing translator 120 in more detail according to a specific embodiment of the invention. In this embodiment, translator 120 communicates with CAD system 100 and database 110 via a UNIX-based network 105. The network can be any type of local area network (LAN) such as a standard ethernet. Translator 120 is equipped with interface 121 for communicating with the LAN. File query and store 122 receives complete CAD data files defining a particular product to be built from CAD system 100 and stores those files in the translator for further analysis. Data compare 125 examines the stored data files in 122 and for each part number it encounters it queries the CAM assembly database as to whether that part in known to the database. These queries are handled by a Standard Query Language (SQL) engine 127 which communicates with the assembly database 130 through a DOS based LAN 145 and an interface 129. For each part number that is not known to database 130, the data compare controller 125 flags that part number and notifies database insert engine 126. Database insert engine 126 then inserts the data into assembly database 130 through network 145.

Five Appendices (A through E) totalling 66 pages are attached to this application. The first four of these appendices list examples of data files used in a specific embodiment of the invention. Appendix E is a source code listing in C++ incorporating the method of an embodiment of the invention. The present invention may be embodied as a compiled version of this source code stored on a floppy disk, hard disk, optical disk, or in a computer memory. Applicant requests that these Appendices be maintained in the file of the patent application but not be reproduced as part of the patent when issued.

The invention has now been described with reference to specific embodiments. Many alternatives will be apparent to those familiar with the art. Therefore it is intended that the invention not be limited except as defined in the attached claims.

What is claimed is:

1. A system for performing integrated design and manufacturing of a product comprising:
   a Computer Aided Design (CAD) system capable of accepting design instructions and capable of generating a detailed description of said product, said description specifying the interrelationship of said product's plurality of parts;
   a first database generated and modified by said CAD system containing detailed design data regarding said product and regarding said parts used to construct said product, said first database containing data which includes data specific to the manufacture of said product but not used by said CAD system in product design;
   a second database, said second database stored in an operating system environment distinct from that storing said first database, containing said data specific to the manufacture of said product;
   a translator for automatically extracting said data specific to the manufacture of said product from said first database and placing said data in said second database;
   a robot capable of assembling said parts into said product; and
   a robot programmer capable of interpreting said second database and of directing specific movements of said robot to assemble said product.

2. The system according to claim 1 wherein said data specific to the manufacture of said parts includes a supply code specifying a type of carrier in which a part is supplied to said robot.

3. A database translator for use in a system for computer-aided design and manufacture of populated printed circuit boards comprising:
   a CAD interface engine capable of presenting queries and receiving data from a first database, wherein said first database is UNIX-based;
   a datafile interpreter capable of analyzing datafiles received from said UNIX-based first database to determine component parts used in the design of said populated printed circuit boards;
   a robot interface engine capable of presenting queries and receiving data from a robot control engine and a second database, and based on said received data from said second database, capable of selectively inserting new data derived from said first database into said second database.

4. The database translator according to claim 3 wherein said CAD interface engine, said datafile interpreter, and said robot interface engine are software modules stored in a computer interpretable storage medium.

5. The database translator according to claim 4 wherein said computer interpretable storage medium is an electromagnetic disk readable in a disk drive.

6. The database translator according to claim 4 wherein said computer interpretable storage medium is an optical disk readable in a disk drive.

7. The database translator according to claim 4 wherein said computer interpretable storage medium is a random access memory.

8. The database translator according to claim 4 wherein said computer interpretable storage medium is a read only memory.

9. The database translator according to claim 4 wherein said computer interpretable storage medium is a removable medium.

10. A method in a computer aided manufacturing system for maintaining and updating data needed to program computer aided manufacturing assembly tools for assembling a product comprising:
    incorporating into a design database data needed to program said computer aided manufacturing assembly tool, including data used in assembling said product but not used in designing said product;
    reading from said design database with a computer, after product design is complete, said data as is needed to program said computer aided manufacturing assembly tools; and
    inserting said data needed to program said computer aided manufacturing assembly tools into a second database; said second database used by said computer-aided manufacturing assembly tools.

11. The method according to claim 10 further comprising, after said reading step:
    querying, for each item of read data, said second database used by said computer-aided manufacturing assembly tools to determine whether said item of data is already present in said second database and if said item of data is present in said second database, not inserting that item in said second database.

12. The method according to claim 11 wherein said first database is part of a UNIX-based CAD design system and wherein said second database used by said computer-aided manufacturing assembly tools is a DOS-based database.

13. The method according to claim 12 wherein said design database is part of a UNIX-based CAD design system and wherein said second database used by said computer-aided manufacturing assembly tool is a Panatools™ database.

14. The method according to claim 10 wherein said data used in assembling said product includes a supply code specifying a type of carrier in which a part is supplied to said assembly tools.

15. A method for designing and manufacturing a populated printed circuit board (PPCB) comprising the steps of:

designing said PPCB using a CAD design package, said CAD design package including a first database for storing physical and electrical characteristics of said PPCB and of a plurality of parts used to construct said PPCB;

incorporating into said first database characteristics of said parts solely useful for the manufacturing of said PPCB but not necessary for the design of said PPCB such that said first database contains data necessary for automatic assembly of said PPCB;

using a computer to read from said first database data necessary for assembling said PPCB;

using said computer to insert said data necessary for assembling said PPCB into a second database, said second databases used for assembling said PPCB;

using said data necessary for assembling said PPCB in said second database to program the actions of a plurality of assembly robots; and using said programmed assembly robots to assemble said PPCB.

16. A method according to claim 15 further comprising, after said reading step:

querying, for each item of read data, said second database used by computer-aided manufacturing tools to determine whether said item of data is already present in said second database and if said item of data is present in said second database, not inserting that item in said second database.

* * * * *